Nov. 12, 1929. G. H. HAMILTON Re. 17,485

LIGHTING MEANS

Original Filed Aug. 21, 1925

INVENTOR.
George H. Hamilton.
BY Rice, Rice & Mann
ATTORNEYS.

Witness:
G. E. Redding

Reissued Nov. 12, 1929

Re. 17,485

UNITED STATES PATENT OFFICE

GEORGE H. HAMILTON, OF GRAND RAPIDS, MICHIGAN, ASSIGNOR TO AMERICAN SEATING COMPANY, OF GRAND RAPIDS, MICHIGAN, A CORPORATION OF NEW JERSEY

LIGHTING MEANS

Original No. 1,613,793, dated January 11, 1927, Serial No. 51,593, filed August 21, 1925. Application for reissue filed December 31 1928. Serial No. 329,571.

The present invention relates to lighting means, particularly such means as are employed for lighting the aisles of theatres and the like; and its object is to provide means of that character improved in certain respects hereinafter appearing.

This object is attained by, and the invention finds preferable embodiment in, the structure or device hereinafter particularly described, and illustrated by the accompanying drawings, in which.

Figure 2:
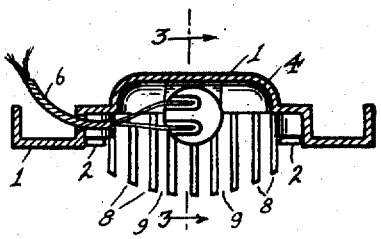
Figure 2 is a horizontal sectional view thereof taken on line 2—2 of the other views, but showing the electric lamp therein in top plan.
Figure 3:
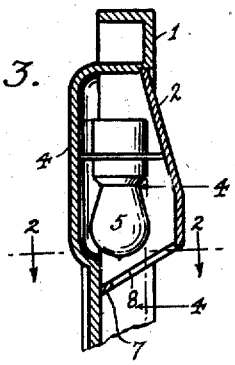
Figure 3 is a vertical central sectional view of a portion of the same, taken on line 3—3 of the other views.
Figure 1:
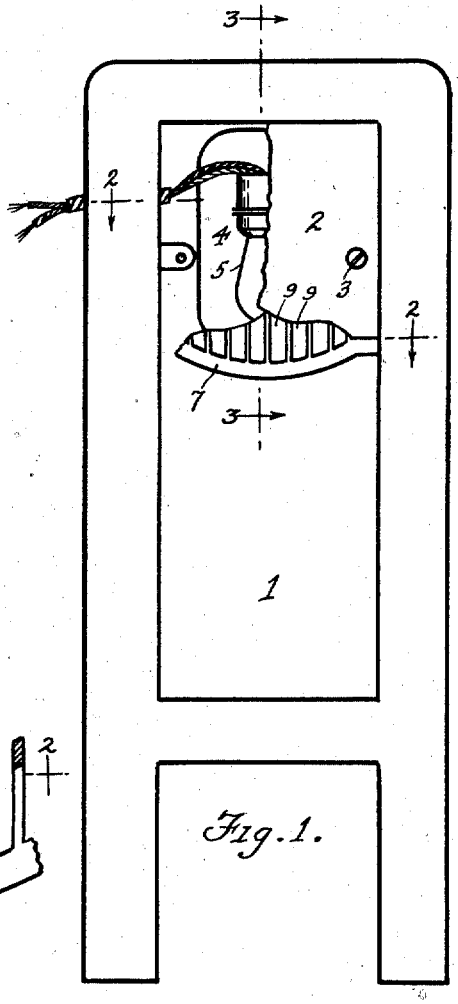
Figure 1 is a view of the outer side of a seat or a chair adjacent the aisle of a theatre, and provided with my lighting means.
Figure 4:
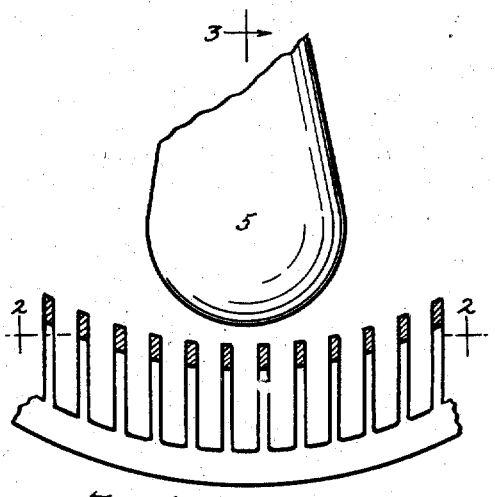
Figure 4 is a view of certain parts of the same, enlarged, and sectioned vertically on line 4—4 of Figure 3.

In the accompanying drawings, my lighting means is shown applied to the aisle-side of a theatre chair or seat. This seat has an upright supporting member 1 carrying a cover member 2 detachably connected to the supporting member as by screws 3. This structure has a chamber 4 formed partially in the supporting member and partially in the cover member (as particularly shown in Figure 3) and containing an electric lamp 5 having suitable electric connections 6. This cover member 2 has a lower side 7 provided with a series of vertically parallel vanes 8 spaced apart to provide openings 9 between them extending from said chamber through the lower side 7 of the cover member, so that light may shine through these openings to illuminate the floor of the aisle adjacent the seat.

As shown, this series of vanes is bowed outwardly from the supporting member 1, and the individual vanes are inclined upwardly-outwardly therefrom, and said vanes, or their upper ends, are disposed circularly—i. e. approximately in the arc of a circle described about the lamp as a center.

It will be seen that this formation or disposition and arrangement of the vanes causes the light from the lamp to be shed only on the floor of the aisle and adjacent the seat; and that the formation of the chamber 4 partially in the supporting member and partially in the cover member (which has the inclined lower side 7) minimizes the necessary space in which the lamp is mounted.

The invention being intended to be pointed out by the claims, is not to be limited to or by details of construction of the particular embodiment thereof illustrated by the drawings or hereinbefore described.

I claim:

1. In a device of the character described: a supporting member having a chamber and a cover member therefor; a lamp in the chamber; said cover member having a plurality of vertically parallel vanes spaced to provide openings therebetween extending from the chamber through the cover member's lower side, the upper ends of the vanes being disposed circularly about the lamp.

2. In a device of the character described: a supporting member having a chamber and a cover member therefor; a lamp in the chamber; said cover member having a plurality of vertically parallel vanes spaced to provide openings therebetween extending from the chamber through the cover member's lower side, the vanes being inclined upwardly-outwardly from the supporting member and their upper ends being disposed circularly about the lamp.

3. In a device of the character described: a supporting member having a chamber and a cover member therefor; a lamp in the chamber; said cover member having an outwardly bowed series of vertically parallel vanes spaced to provide openings therebetween extending from the chamber through the cover member's lower side, the vanes being inclined upwardly-outwardly from the supporting member and their upper ends being disposed circularly about the lamp.

4. In a device of the character described: a supporting member having a chamber and a cover member therefor; a lamp in the chamber; said cover member having a plurality of downwardly extending vanes spaced to provide openings therebetween extending from the chamber through the cover member's lower side, the vanes being inclined upwardly outwardly from the supporting member and their upper ends being disposed circularly about the lamp.

5. In a device of the character described: a chair having a side frame provided with an outwardly open cavity; a cover plate over the open outer side of said cavity and provided with a cavity open toward the first-mentioned cavity, said cavities forming a lamp chamber, the lamp chamber thus formed having a light-emitting opening below the hereinafter-mentioned lamp; a lamp in said chamber mounted on the side frame at the rear wall of the cavity thereof and extending partly into one of said cavities and partly into the other cavity whereby the rays of light will be thrown directly downwardly and outwardly from the lamp to illuminate an aisle without swinging the lamp outwardly from the side frame, the cover plate being movable to give access to the lamp.

In testimony whereof I have hereunto set my hand at Grand Rapids, Michigan, this 26th day of December, 1928.

GEORGE H. HAMILTON.